United States Patent [19]

Driscoll et al.

[11] 4,227,789

[45] Oct. 14, 1980

[54] PHOTOGRAPHIC SYSTEM ACCESSORY FOR SMALL FORMAT FILM SHEETS

[75] Inventors: John J. Driscoll, Andover; Nicholas Gold, Arlington; Philip R. Norris, North Reading; Richard R. Wareham, Marblehead, all of Mass.

[73] Assignee: Polaroid Corporation, Cambridge, Mass.

[21] Appl. No.: 902,064

[22] Filed: May 2, 1978

[51] Int. Cl.[2] ..................... G03B 17/02; G03B 17/26; G03B 17/52; G03B 19/06

[52] U.S. Cl. ........................................ 354/86; 354/159; 354/210; 354/212; 354/276

[58] Field of Search ................................. 354/83–86, 354/159, 210, 212, 174, 276; 74/89.17, 102, 104, 110

[56] References Cited

U.S. PATENT DOCUMENTS

| | | | |
|---|---|---|---|
| 1,249,172 | 12/1917 | Mullendore et al. | 354/161 |
| 1,399,694 | 12/1921 | Deal | 354/174 |
| 1,799,145 | 4/1931 | Bischof | 74/110 |
| 2,732,723 | 1/1956 | Crofton | 74/110 |
| 3,165,993 | 1/1965 | Stern | 354/160 |
| 3,263,511 | 8/1966 | Wellstein | 74/102 |
| 3,702,580 | 11/1972 | Erlichman | 96/27 R |
| 3,760,702 | 9/1973 | Seiden | 354/118 |
| 3,765,313 | 10/1973 | Faris et al. | 354/210 |
| 3,936,850 | 2/1976 | Goto | 354/86 X |
| 4,068,244 | 1/1978 | Douglas | 354/85 |

Primary Examiner—L. T. Hix
Assistant Examiner—Shelley Wade
Attorney, Agent, or Firm—Leslie J. Payne; Robert L. Berger

[57] ABSTRACT

An accessory for use in an instant camera designed for standard film packs and by which the same camera can be used to expose and process self-processing film sheet assemblies of reduced image format size prepackaged in corresponding sized film packs. The accessory is in the nature of a U-shaped housing having exterior planar dimensions to complement the interior planar dimensions of a well in the camera for receiving a standard film pack. The U-shaped configuration of the housing defines a recess to receive and position the modified film pack of reduced size. The accessory carries movement transmitting relays by which actuation of a camera mounted switch is energized by insertion of the modified film pack and by which movement of a camera carried pick is transmitted to an accessory pick for initial ejecting movement of an exposed film sheet from the modified pack. The accessory pick is actuated preferably by a camera pick movement amplifier to accommodate the reduced exterior dimensions of the reduced format film sheet. Also, a viewfinder mask is provided as an adjunct to the accessory so that a viewed image will be collated with the reduced image format of film sheets in the modified film pack.

12 Claims, 17 Drawing Figures

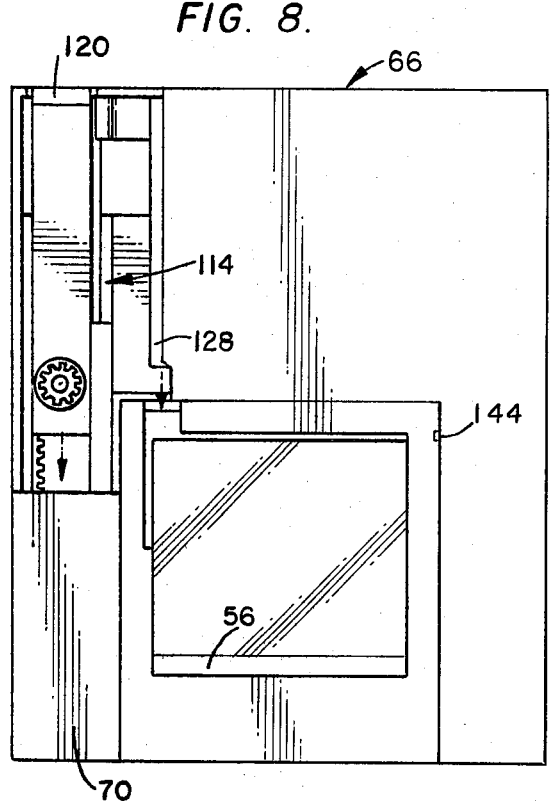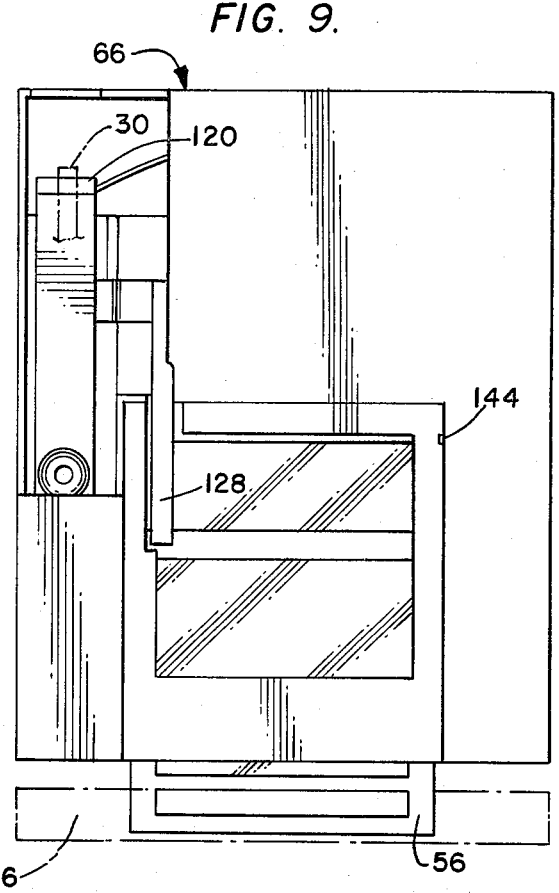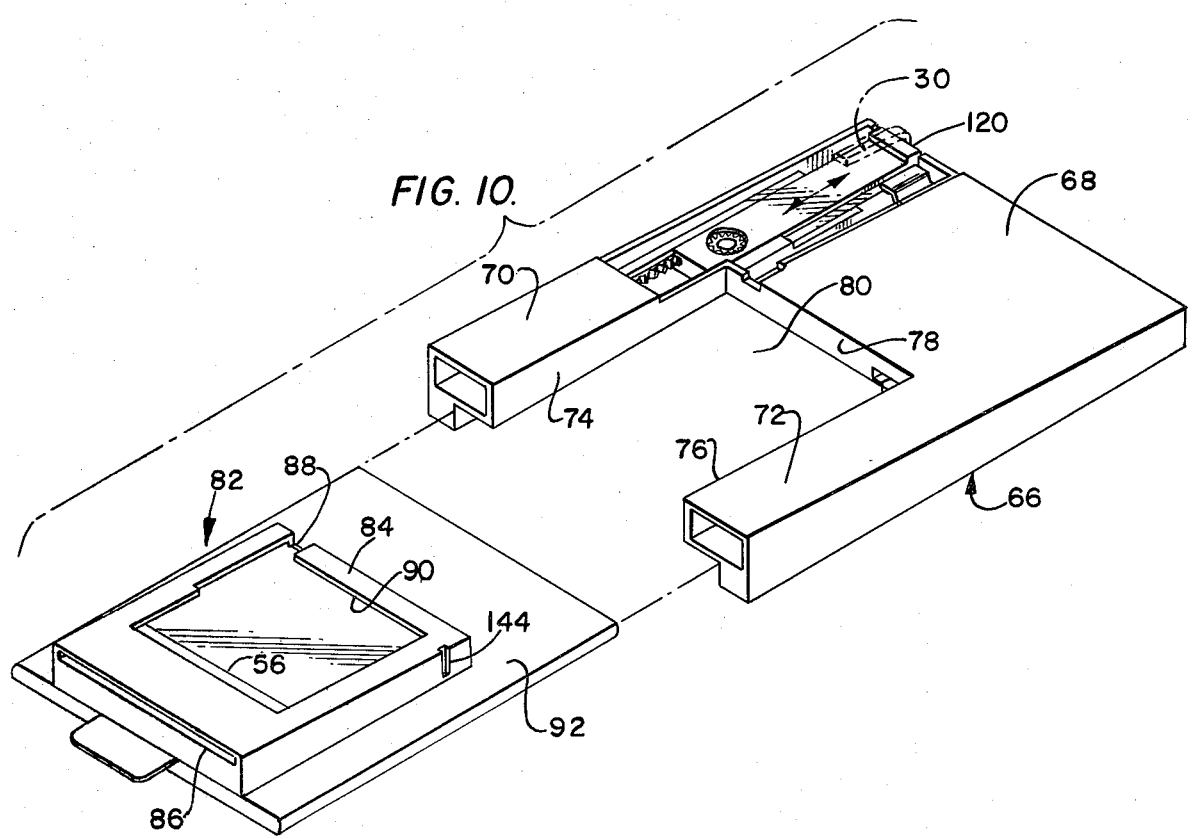

PHOTOGRAPHIC SYSTEM ACCESSORY FOR SMALL FORMAT FILM SHEETS

BACKGROUND OF THE INVENTION

This invention relates to photographic systems and more particularly, it concerns apparatus for accommodating modified format sizes of photographic sheet film in existing camera systems.

In the camera system marketed by Polaroid Corporation under the trademarks "Polaroid SX-70 Land Camera" and "Polaroid SX-70 Land Film", camera structure and operation are integrated with a container or pack of film in the sense that electric power for camera operation is supplied by a battery packaged with each film pack, a main power switch is closed upon full insertion of the film pack to connect the battery with camera carried electric circuitry, and the film container defines the location and to some extend the format area of an image to be formed on the uppermost of successive film sheet assemblies in the container. Each film sheet assembly in the system carries a supply of processing fluid in an amount calibrated to cover the image format area after exposure and passage of the sheet assembly between a motor driven processing roller pair supported in the camera. In particular, the processing fluid is spread across the interface between a pair of plastic sheets in each assembly, at least one of which plastic sheets is transparent for exposure of a light sensitive layer carried between the sheets and so that the resulting positive photographic image may be viewed.

Because of the construction of each film sheet assembly, its exterior appearance is that of a framed photograph in which four marginal edges are defined by paper or other similar material folded about these edges to secure the two plastic sheets in overlying coextensive relationship. The bottom marginal edge of the framed photograph is wide relative to the marginal side and top edges principally because it encloses the pod or supply of processing fluid carried by each film sheet assembly. Also, because of the construction of the sheet assemblies, the top wall of the container in which the film sheets are contained is provided with marginal lips dimensioned to substantially cover the framing margins of the photographic sheet including the bottom marginal edge in which the processing fluid pod is located.

In the operation of the system, the uppermost film sheet assembly in the container is exposed and then engaged at its rear edge (the top edge of the photograph) by a linearly driven pick and advanced through a slot in the front wall of the container for a distance calibrated to place the leading edge of the exposed film sheet (the bottom edge of the photograph) within the nip of the processing roller pair. The rollers then feed the exposed sheet assembly forwardly to first rupture the processing fluid pod, spread the processing fluid across the interface between the plastic sheets and finally discharge the exposed and processed sheet from the camera.

The outside dimensions of the presently available "Polaroid SX-70 Land Film" unit are approximately 89×108 mm to provide a substantially square image area approximately 79 mm on the side. The width of the framing margin at the bottom of the photograph is approximately 19 mm whereas the framing margins at the side and top edges of the photograph are approximately 5 mm. While the dimensions of the photograph are well suited for storage in albums or the like, versatility of such systems would be enhanced significantly by a capability of providing smaller format photographs, such as for example a 45 mm format to provide a "wallet-size" photograph or a photographic positive of a 35 mm format. The problems associated with adapting the existing system to such smaller format photographs entail not only one of positioning the smaller sized format film sheets properly within the existing film well of the camera but also an accommodation to the smaller format photograph of camera carried components such as the camera viewing system, the pick by which each film sheet is advanced from the container to the processing rollers, the power switch closed by full insertion of the film pack and the attainment of a smaller format photograph in which the marginally framed portions thereof, particularly the bottom marginal edge may both contain a supply of processing fluid and be properly proportioned aesthetically to the reduced image area.

SUMMARY OF THE PRESENT INVENTION

In accordance with the present invention, an existing instant camera designed to expose self-processing film sheet assemblies of a standard fomat size is adapted by an accessory for exposure of small format film sheet assemblies pre-packaged in a modified container complementing the size of the small format film sheets. The accessory is incorporated as a U-shaped housing having exterior planar dimensions complementing the interior planar dimensions of a camera well adapted to receive the standard film pack. The housing defines a downwardly opening recess sized to receive and position the modified film pack. The functional coaction of the standard film pack with the camera, in terms of electrical switch actuation resulting from film pack insertion, is retained by a switch actuating relay carried by the accessory.

In order to effect initial translation of an exposed film sheet assembly from the camera carried modified film pack to the pressure nip of a processing roller pair carried by the camera, the motion of a pick carried by the existing camera is transmitted by a pick relay to an accessory pick cooperable with the modified film pack. To accommodate a proportional reduction of all dimensions of the smaller format film sheet assembly in the existing camera structure, and to accommodate a correspondingly increased distance of travel of the small format film sheet from the modified film pack to the pressure nip of the processing rollers, the movement of the accessory pick is amplified over that of camera pick movement. As an adjunct to the accessory, a viewfinder mask is provided to correlate the image seen in the viewfinder with the location and size of the smaller format film sheets.

Among the objects of the present invention are therefore: the provision of a photographic system in which an existing camera is adapted to expose prepackaged film sheets of reduced format size in a film pack complementing the reduced size of the film sheets; the provision of an accessory by which a modified film pack containing small format film sheet assemblies may be accommodated by an existing camera structure adapted to expose and process the film sheet assemblies in the modified film pack; the provision of such an accessory which enables the use of small format film sheet assemblies in which all dimensions are reduced proportionally from that of a standard film sheet assembly for which the camera is designed; the provision of such an accessory having a film sheet advancing pick movable through a distance in excess of that in which a camera carried pick is moved in the existing camera; and the provision of a modified film pack assemblage by which relatively small format film sheets may be exposed and processed in an existing camera designed for large format film.

Other objects and further scope of applicability of the present invention will become apparent from the detailed description to follow taken in conjunction with the accompanying drawings in which like parts are designated by like reference numerals.

BRIEF DESCRIPTION OF THE DRAWINGS

FIG. 8 is a plan view of one embodiment of the accessory of the present invention;

FIG. 9 is a plan view similar to FIG. 8 but showing illustrated components in a different operative position;

FIG. 10 is an exploded perspective view of the embodiment illustrated in FIG. 8;

DETAILED DESCRIPTION OF THE PREFERRED EMBODIMENTS

Figure 1:
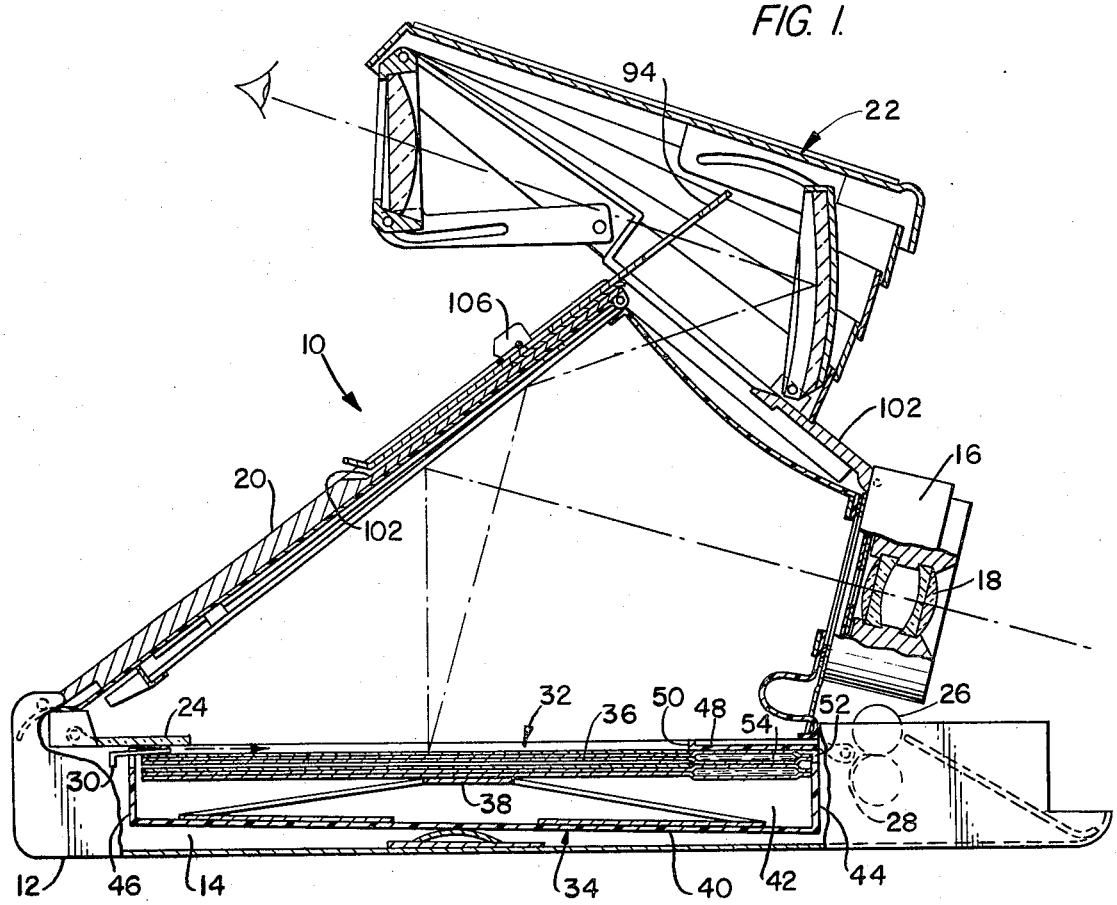
FIG. 1 is a longitudinal cross-section depicting operating components of a foldable single lens reflex camera in which the present invention may be used.

In FIG. 1 of the drawings, a foldable, single lens reflex camera 10 is shown to include a body 12 defining a film pack well 14, a shutter housing 16 supporting an objective lens 18, a foldable cover member 20 and a view finder 22. A reflex mirror 24 (only partially shown in FIG. 1) is pivotally supported by the body 12 for movement between a viewing position in which it overlies the well 14, and an exposure position in which it lies against the underside of the cover member 20.

The camera 10, as thus constituted, is now well-known and available commercially under the trade designation "The Polaroid SX-70 Land Camera".

In addition to the components identified in the preceding paragraph, the camera includes as existing components, a processing roller pair 26 defining a pressure nip 28 and a linearly driven pick 30. In FIG. 1, the camera 10 is shown loaded with a conventional or standard film pack 32 defined by a container 34 which houses a plurality of overlying film sheet assemblies 36 biased upwardly by a leaf spring 38. As shown in FIG. 1 and also in FIG. 4 of the drawings, the container 34 includes a bottom wall 40, side walls 42, a front wall 44, a rear wall 46 and an upper marginal wall 48 defining a rectangular opening 50 through which the uppermost of the film sheet assemblies 36 may be exposed. The front wall 44 of the container is provided at its upper end with a slot 52 through which the uppermost film sheet assembly 36 may be advanced forwardly to the pressure nip 28 of the processing roller pair 26. As is well-known, this operation ruptures a processing fluid pod 54 contained in each film sheet assembly and spreads the processing fluid uniformly over the image format area of each sheet assembly 36. Also, the left rear corner of the back wall 46 is cut away, as is the upper marginal wall 48 in this region so that the pick 30 may engage the rear edge of the uppermost film sheet assembly 36 to advance this sheet assembly through the slot 52 until the leading edge of the assembly is engaged by the pressure nip 28. This cut out portion of the container 34 is designated by the reference numeral 55 in FIG. 4 of the drawings.

Figure 4:
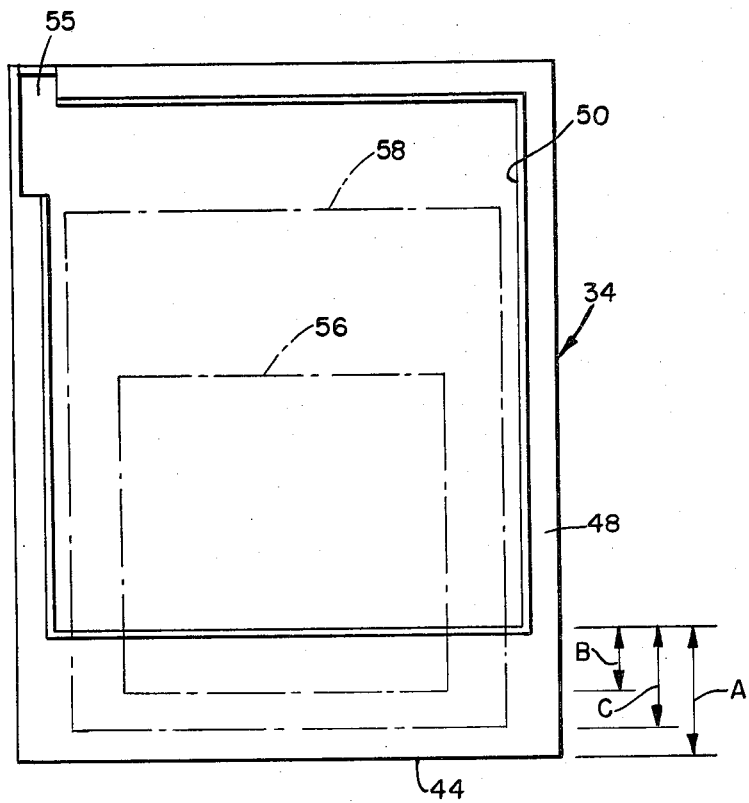
FIG. 4 is a plan view illustrating schematically the relative sizes and positioning of different format sizes of film sheet assemblies contemplated by the present invention for use in the camera illustrated in FIG. 1.

To facilitate an understanding of certain structural and operational features of the present invention which will be described more fully below, it will be noted by reference to FIG. 4 of the drawings that in the standard film container 34 heretofore used with the camera 10 to provide an image format area approximating the area of the opening 50, the front marginal portion of the top wall 48 extends from the front wall 44 of the container 34, rearwardly by a distance A to the front edge of the opening 50. The distance A corresponds very closely to the width of the bottom margin of an existing "Polaroid SX-70 Land Film" photograph and is predicted primarily on the space requirements of the processing fluid pod 54 needed to accommodate the image format area of the existing film sheet assemblies. The optical system of the camera 10, including that of the viewfinder 22, is designed to register with the area represented by the opening 50 in terms both of size of the opening and the location thereof when the container 34 is properly and fully loaded in the well 14.

Figure 5:
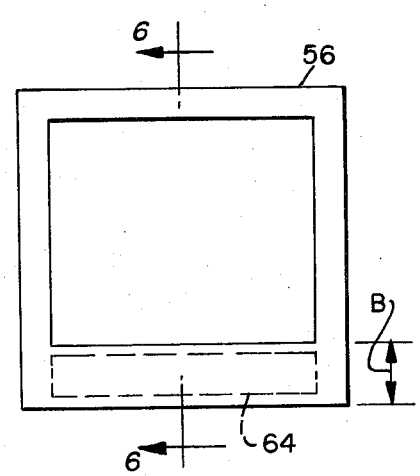
FIG. 5 is a plan view of a film sheet assembly having a reduced format size accommodated by the present invention.
Figure 6:
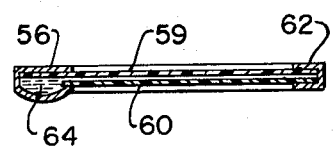
FIG. 6 is a cross-section on line 6—6 of FIG. 5.
Figure 7:
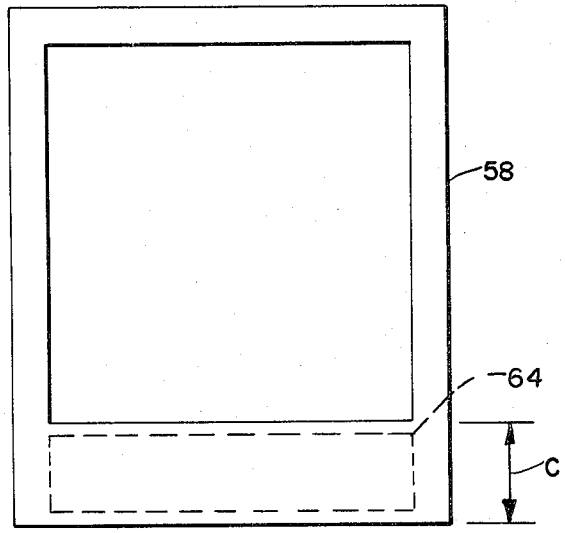
FIG. 7 is a plan view illustrating another film sheet assembly of a different format size than that illustrated in FIG. 5.
Figure 11:
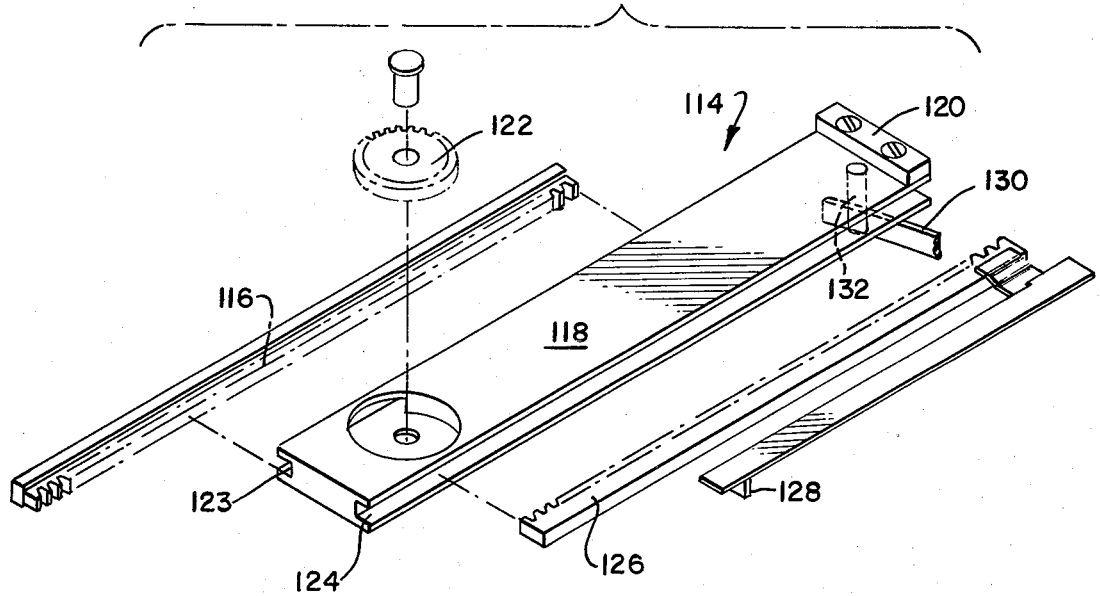
FIG. 11 is an exploded view of a pick amplifier incorporated in the embodiment of FIG. 8.
Figure 12:
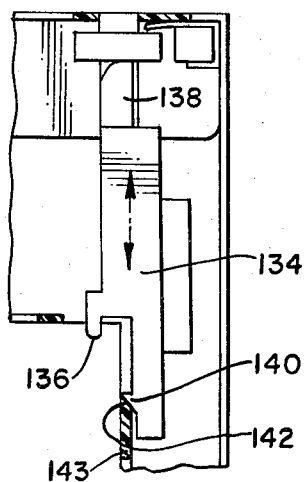
FIG. 12 is a plan view of switch actuating relay components in the embodiment of FIG. 8.
Figure 13:
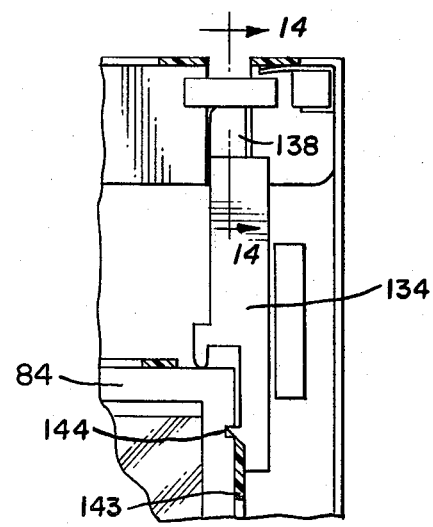
FIG. 13 is a plan view similar to FIG. 12 but showing the illustrated components in a different operative position.

In FIGS. 5–7 of the drawings, two sizes of film sheet assemblies to be accommodated by the accessory of the present invention are designated by the reference numerals 56 and 58, respectively. As may be seen in FIGS. 5 and 6, the construction of the sheet assembly 56, apart from size, may be identical to the conventional film sheet assembly and as such includes upper and lower plastic sheets 59 and 60, at least the upper sheet 59 being transparent, secured about their margins by the folded framing 62 of paper or other suitable material. A processing fluid pod 64 is provided in the lower framing margin. The film sheet assembly 58 illustrated in FIG. 7 is identical to that of FIGS. 5 and 6 except for size. Specifically, the sheet 56 illustrated in FIG. 5 is intended to represent a 35 mm image format whereas the sheet illustrated in FIG. 7 represents a 45 mm square image format, a size consistent with "wallet-size" photographs.

Because of the reduced image format area of the film sheet assemblies 56 and 58, the quantity of processing fluid needed for coverage of the effective image format area is less than that required in larger film sheet assemblies. Also for aesthetic reasons, it is desirable to confine the width of the frame margin needed to cover the processing pod 64 as small as possible. Thus, the lower framing margin of the film sheet assembly 56 is represented by the distance B in FIG. 5 whereas the corresponding distance for the film sheet assembly 58 is represented by the reference letter C in FIG. 7. The dimensions B and C as well as the exterior outline of the sheet assemblies 56 and 58 are also shown in FIG. 4. In each case, the fore and aft location of the image format area of the respective film sheet assemblies 56 and 58 is determined by the dimensions B and C in reference to the front edge of the opening 50.

One embodiment of the small film adapting accessory of the present invention is shown in FIGS. 8–14 of the drawings and is designated generally by the reference numeral 66. The exterior configuration of the accessory 66 is established by a generally U-shaped housing to define a rearwardly disposed base portion 68 and forwardly projecting leg portions 70 and 72. The outside planar dimensions of the accessory, that is, overall length, and depth, are the same as the corresponding dimensions of the standard film container 34. Interior wall surfaces 74 and 76 on the leg portions 70 and 72, respectively, together with forwardly facing wall surface 78 on the base portion 68, define a forwardly opening film pack recess 80.

In FIGS. 8–10, a modified film pack 82 adapted to fit the recess 80 is shown to include a container 84 housing the afore-mentioned film sheet assemblies 56. Though of reduced size, the container 84 resembles the previously existing or standard container 34 to the extent that it is provided with a slot 86 in its front wall, a cut-out 88 opening through the rear wall thereof and an exposure window 90 in its top wall generally conforming to the framing margins of the film sheet 56 as shown in FIG. 5 of the drawings. Because the film pack of the existing system carries a sheet-like storage battery for supplying electrical power to the various camera contained components, the bottom of the container 82 is defined fined by an enlarged sheet-like portion 92 to house the battery. A portion of the under surface of the leg portions 70 and 72 as well as the base portion 68 of the accessory 66 are recessed to accommodate the battery portion 92 of the film pack 82. In light of the exterior configuration of both the film pack 82 and the accessory 66 as shown most clearly in FIG. 10, it will be appreciated that the accessory 66 may be loaded into the existing well 14 of the camera 10 and subsequently the film pack 82 may be inserted to the position shown in FIG. 8 in the same manner in which a conventional film pack is loaded. The relative position of the film sheet assembly in the film pack 82 to the design format area of the camera is as described above and as depicted in FIG. 4 of the drawings.

Figure 2:
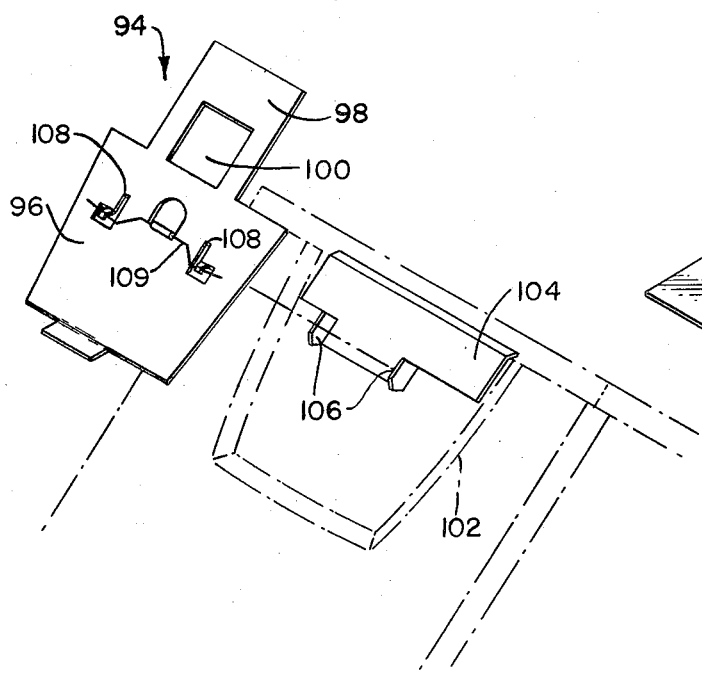
FIG. 2 is an exploded perspective view illustrating a viewfinder mask in accordance with the present invention.

To accommodate the relatively small format size of the film sheet assemblies 56, no modification of the exposure optics of the camera 10 need be made. To facilitate proper viewing of the image to be recorded on the reduced size film sheet 56, however, the viewfinder 22 must be modified. To this end, and as shown in FIGS. 1 and 2 of the drawings, a removable viewfinder mask 94 is provided as an adjunct to the accessory of the present invention. The mask 94 is in the form of a thin sheet of metal or other similar form sustaining opaque material and includes a generally trapezoidal mounting portion 96 from which a mask portion 98 extends. A window 100 corresponding in size to the reduced format size of the film sheet 56, taking into account the optical parameters of the viewfinder 22, is provided in the mask portion 98.

The trapezoidal configuration of the mounting portion 96 contemplates the shape of a viewfinder recess 102 provided in the cover member 20 of the existing camera 10. A mount 104 for the mask 94 is secured by pressure-sensitive adhesive, for example, to the upper edge of the cover. The mount 104 has a pair of projecting lugs 106 positioned so as not to interfere in any way with collapsibility of the viewfinder 22 and the camera 10. The lugs 106 extend through slots 108 in the trapezoidal body portion 96. The mask 94 is secured in place by a detent spring 109 engaging the lugs 106.

Figure 3:
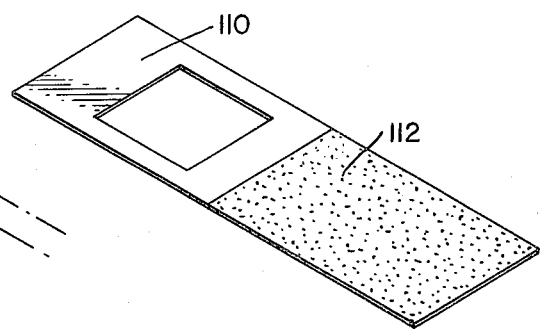
FIG. 3 is a modified embodiment of the viewfinder mask illustrated in FIG. 2.

An alternative embodiment of the mask 94 is shown in FIG. 3 and designated by the reference numeral 110. In this instance, the mask is a simple sheet of opaque material provided with an area of pressure-sensitive adhesive 112 to facilitate its being secured against the base of the viewfinder recess 102. By use of appropriate indicia (not shown) the mask may be positioned properly in the optical path of the viewfinder as shown in FIG. 1 of the drawings.

With reference again to FIGS. 4 and 8–11 of the drawings, it will be noted that because the leading edge of the film sheet 56 is spaced from the front edge of the film pack 82 by a distance approximating the difference between the afore-mentioned dimensions A and B (FIG. 4), the distance of film sheet advance by the camera pick 30 will be less than that required for the leading edge of the film sheet assembly 56 to reach the nip 28 of the processing roller pair 26. The accessory 26 is therefore, provided with a pick movement amplifier to assure proper processing operation of the film unit 56 after exposure. The pick amplifier is designated generally by the reference numeral 114 and the components thereof are shown most clearly in FIG. 11 of the drawings. In particular, the leg portion 70 of the accessory 60 houses a fixed rack member 116 along the interior of the side wall thereof. An elongated carrier 118 having a pick abutment 120 at its rear end supports a rotatable pinion 122 to be engaged with the rack 116. The carrier 118 is provided with guide grooves 123 and 124 in opposite side edges. The fixed rack 116 fits within the groove 123 and thus guides movement of the carrier 118. The groove 124 on the other side is adapted to guide a movable rack member 126 in engagement also with the pinion gear 122. An accessory pick 128 is fixed to the movable rack 126 and also the carrier 118 is biased rearwardly to an initially retracted position by a leaf spring 130 engaging a pin 132 depending from the carrier.

As shown in FIGS. 8, 9 and 10, the accessory pick 128 is located to register with the cut-out 88 in the container 84 of the reduced size film pack 82 to engage the uppermost film sheet assembly 56 after it has been exposed. The pick abutment 120 of the carrier 118, on the other hand, is positioned to be engaged by the pick 30 provided in the camera 10. Because of the meshing engagement of the pinion 122 with the fixed rack 116 and the movable rack 126, coupled with the connection of the accessory pick 128 to the rack 126, it will be seen that movement of the carrier 118 by the camera pick 30 will cause the accessory pick 128 to move through twice the distance of the camera pick 30. As a result, the leading edge of each film sheet assembly 56 will be fed to the nip 28 of the processing roller pair 26.

Figure 14:
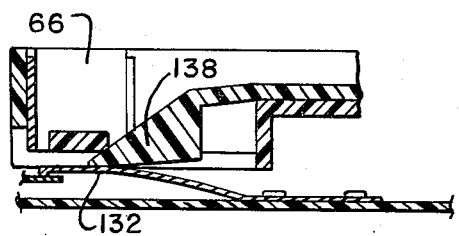
FIG. 14 is an enlarged fragmentary cross-section taken along line 14—14 of FIG. 13.

Although not shown in FIG. 1 of the drawings, the camera 10 is provided with a main switch adapted to be actuated only when a film pack is fully inserted. This switch is shown in FIG. 14 of the drawings and designated by the reference numeral 132. To retain the function of the switch 132 using the accessory 66, the latter is provided with a slidable switch actuating relay 134 shown most clearly in FIGS. 12-14. In particular, the relay 134 includes a lug 136 adapted to project into the recess 80 from through the wall surface 78 to be engaged by the film pack 82 upon insertion thereof as described. Rearward movement of the relay 134 as a result of film pack insertion will cause a lug 138 on the relay 134 to engage and close the switch 132.

In addition, a tang 140 is formed on the relay 134 and positioned to be forwardly and outwardly of the lug 136. The tang 140 is provided with a forwardly facing cam surface 142 adapted to cooperate with the rear end of an inner wall 143 (defining the wall surface 76) on the leg 72 of the accessory. The container 84 of the film pack 82 is formed with a recess 142 positioned to register with the tang 140 when the film pack is inserted. Thus, as the pack 82 is inserted and the relay engaged, the ensuing rearward movement of the relay will be accomplished by a slight pivotal movement of the relay causing the tang to engage in the slot 144. Not only will the tang provide a measure of resistance to outward movement of the film pack, but also it will assure forward movement of the relay 134 to open the switch 132 when the empty container 84 of the film pack is removed.

Figure 15:
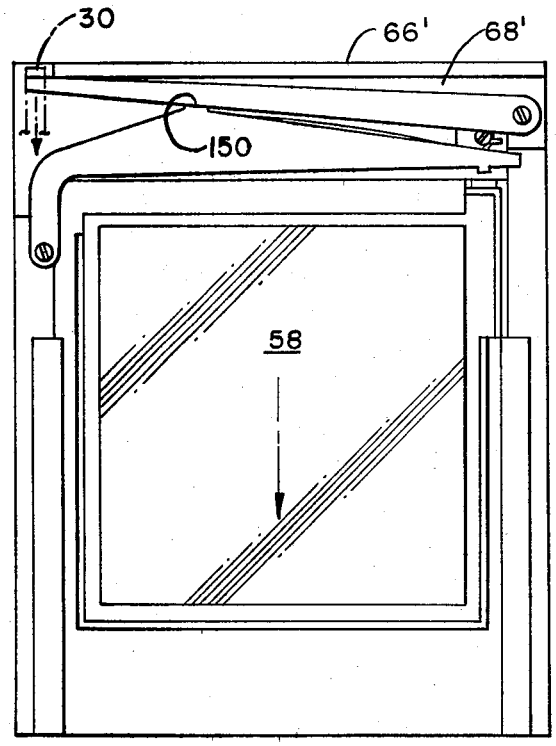
FIG. 15 is a plan view illustrating a modified embodiment of the accessory of the present invention.
Figure 16:
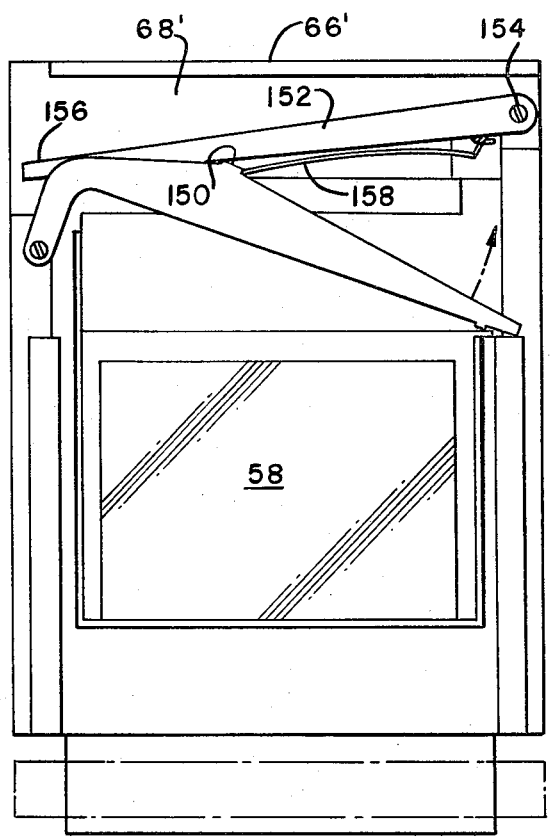
FIG. 16 is a plan view of the embodiment illustrated in FIG. 11 but with illustrated components shown in a different operating position.
Figure 17:
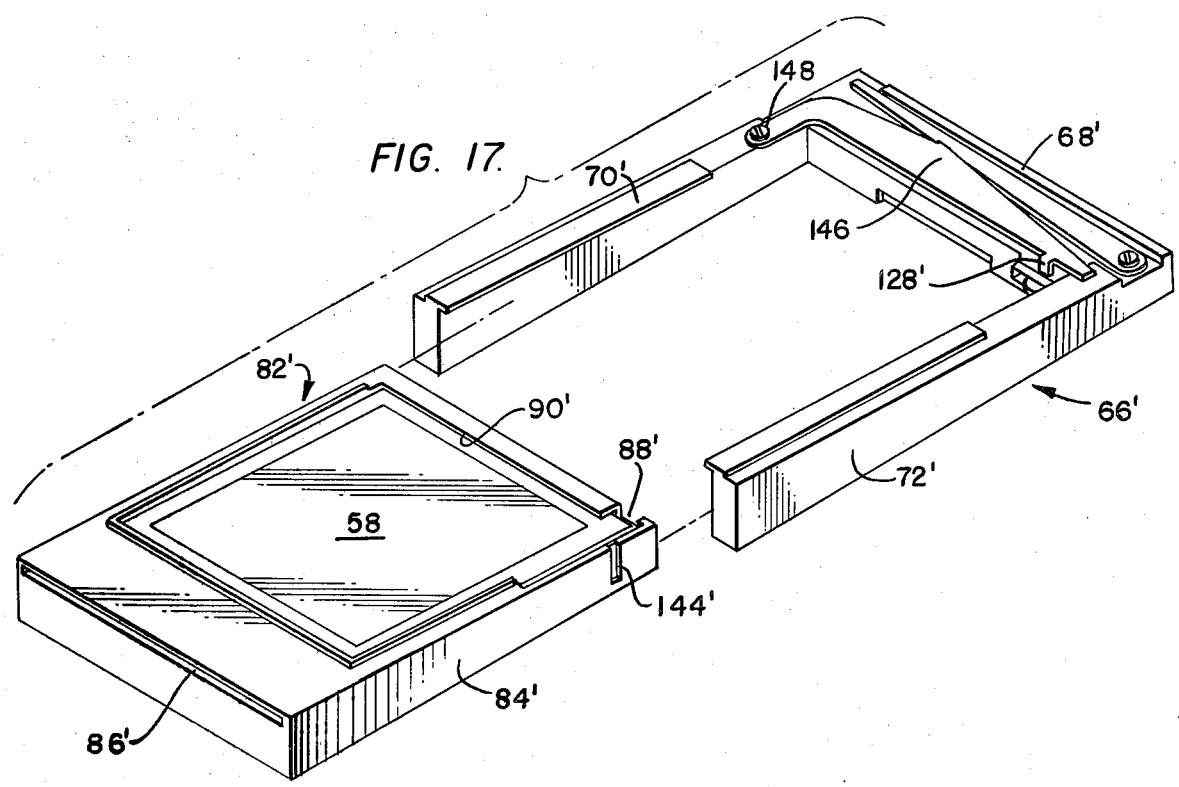
FIG. 17 is an exploded perspective view of the embodiment of FIG. 15.

In FIGS. 15-17 of the drawings, an alternative embodiment of the accessory is shown in which parts corresponding functionally to parts in the previously described embodiment of FIGS. 8-14 are designated by the same reference numerals but primed. As illustrated, the modified accessory 66' is particularly though not exclusively adapted for use with a film pack 82' of a size to accommodate the film sheet assemblies 58 described above with respect to FIGS. 4 and 7. The construction of the film pack 82' is the same as that of the previous embodiment with the exception that the film pack contained storage battery (not shown) may be located in the bottom of the film pack container in the same way as existing film packs designated "Polaroid SX-70 Land Film". Also, it will be noted that the cut-out 88' is located on the opposite side of the pack 82'.

The principal difference between the embodiment of FIGS. 15-17 and the embodiment of FIGS. 8-14 lies in the actuating mechanism for the accessory pick 128'. In particular, it will be noted that the accessory pick 128' is supported near the end of a bell crank lever 146 pivoted from the leg 70' by a pintel 148. The arm 146 is formed with a fulcrum lug 150 adapted to be engaged by a second lever 152 pivoted by a pintel 154 located in the base portion 68' and aligned with the leg portion 72'. The free end 156 of the second lever 152 is positioned to be engaged by the camera pick 30 as shown. A leaf spring 158 engages the back of the fulcrum tang 150 so that the assembly of the two levers 146 and 152 will be biased to a retracted or rearward position.

As will be noted by a comparison of FIGS. 15 and 16, forward movement of the end 156 of the lever 152 by the camera pick 30 will effect pivotal movement of the bell crank lever arm 146 to move the accessory pick 128' through a distance larger than the distance through which the camera pick 30 moves and by a distance dependent on the relative position of the pintel 148, the fulcrum lug 150 and the accessory pick 128'. In other words, moving the position of the fulcrum lug 150 toward the pintel 148 from the center of the respective levers will result in increased amplification of movement of the accessory pick 128'. By positioning the fulcrum lug 150 toward the accessory pick 128' a reduced amplification of accessory pick movement can be affected. The alternative embodiment of the pick amplification system illustrated in FIGS. 15-17, therefore, offers the advantage of providing accessory pick movement amplification as needed for the particular size of film sheet format necessary to advance each film sheet from the pack container to the processing roller pair of the camera 10. The construction offers further a measure of reduced costs by comparison of that of the embodiment of FIGS. 8-14.

It is to be noted that while the U-shaped configuration of both illustrated embodiments is desirable from the standpoint of simplicity and from the standpoint of accommodating small format film packs of a thickness the same as or containing the same number of stacked film sheet assemblies as presently available film packs, other specific configurations of the accessory 66 or 66' are contemplated by the present invention. For example, the housing of the accessory may include a floor extending between the leg portions 72 and 74 (or 72' and 74') to define a forwardly and upwardly opening recess capable of receiving a film pack of reduced thickness. Also the accessory housing may be shaped as a hollow generally rectangular parallelepiped with a forwardly opening recess to receive the small format film pack. In this latter instance, the top wall of the housing would be windowed for exposure of the film sheet assemblies.

Similarly, the provision of a pick amplifier in both of the embodiments described and illustrated herein is desirable to accommodate a small format film sheet assembly in which all dimensions are reduced proportionally. In accordance with broader aspects of the present invention, however, the actuating mechanism by which movement of the camer pick 30 is transmitted to the accessory pick 128 (or 128') may involve a direct interconnection of the accessory pick with the camera pick abutment so that the distances of camera pick movement and accessory pick movement are equal. An accessory pick actuating mechanism of this type would be applicable to film sheet assemblies wherein the lower marginal framing of the film sheet assembly is retained equal to the dimension A (FIG. 4).

Thus, it will be seen that as a result of the present invention, a unique camera accessory is provided by which the above-mentioned objectives are fully achieved. In the interest of clearly setting forth a practical application of the described accessory embodiments, such embodiments have been correlated with the construction of the "Polaroid SX-70 Land Camera". It will be appreciated, however, that the invention has application to other specific types of instant cameras adapted to be used with film packs including a plurality of film sheet assemblies housed in a container. It is also contemplated that modifications and/or changes may be made in the embodiments described herein without departure from the inventive concepts manifested by these embodiments. It is expressly intended, therefore, that the foregoing description is illustrative only, not limiting, and that the true spirit and scope of the present invention be determined by reference to the appended claims.

What is claimed is:

1. In a self-processing photographic system including a camera normally intended to operate with a standard film pack in which film sheet assemblies are successfully presented at a window in an upper marginal wall of a film pack container, the camera having a well to receive and position a standard film pack for exposure of each film sheet assembly through the container window, a processing roller pair defining a pressure nip through which each film sheet assembly is passed for withdrawl from the film pack and ejection from the camera, and pick means for advancing each film sheet assembly from the standard film pack to the pressure nip of the processing roller pair, the improvement comprising:

an accessory for adapting the camera to expose small format film sheet assemblies carried in a modified film pack of a size smaller than the interior size of the well, said accessory comprising:

a housing having exterior planar dimensions generally complementing the interior planar dimensions of the film pack well, said housing defining a recess to receive and position the modified film pack; and means supported by said housing to transmit movement of the pick means of the camera to successive ones of the small format film sheet assembly presented upwardly from the modified film pack responsive to successive strokes of the pick means of the camera and for automatically returning to an initial position after each advancement of the pick means of the camera in readiness for movement of the next successive small film sheet.

2. The system recited in claim 1, wherein the camera includes a power switch actuated by insertion of the standard film pack into the well of the camera, the accessory including further, means supported by said housing for actuating the power switch upon insertion of the modified film pack into said recess, said switch actuating means comprising a generally elongated slidable switch relay having a first lug adapted to project into the recess and positioned to be engaged by the modified film pack upon insertion thereof and having a second lug thereon which engages and closes the power switch after sliding movement of the switch relay caused by the first lug being moved by the modified film pack.

3. The system recited in claim 1, wherein said means to transmit movement of the camera pick comprises an accessory pick mounted movably on said housing in a position to engage the small format film sheet assembly presented upwardly from the modified film pack received in said recess.

4. The system recited in claim 3, including amplifying means by which movement of said accessory pick is increased over movement of the camera pick.

5. The system recited in claim 4, wherein said amplifying means comprises a pair of lever members, one of said levers supporting said accessory pick and having fulcrum means adapted to be engaged by the other of the levers, said other lever having an end adapted to be engaged by the camera pick.

6. In a self-processing photographic system including a camera normally intended to operate with a standard film pack in which film sheet assemblies are successively presented at a window in an upper marginal wall of a film pack container, the camera having a well to receive and position a standard film pack for exposure of each film sheet assembly through the container of the window, a processing roller pair defining a pressure nip through which each film sheet assembly is passed for withdrawal from the film pack and ejection from the camera, and pick means for being selectively stroked so as to advance each film sheet assembly from the film pack to the pressure nip of the processing roller pair, the improvement comprising:

a small format film pack including one or more small format film sheet assemblies and a small container to support said small format sheet assemblies in superimposed relationship;

an accessory having exterior planar dimensions complementing the interior planar dimensions of the film pack well, said accessory defining a recess to receive and position said small film pack in the camera well for exposure and processing; and means supported by said accessory to selectively transmit movement of the pick means of the camera to successive ones of the small format film sheet assemblies presented upwardly from the small format film pack responsive to successive strokes of the pick means of the camera and for automatically returning to an initial position after each advancement of the pick means of the camera in readiness for movement of the next successive small format film sheet.

7. An accessory for use in a camera normally intended to operate with an standard pack of self-processing film units, wherein the standard pack has a given outside surface conformation and means for defining an exposure window of given size through which film units within the standard film pack may be exposed, the camera including means for defining a well to receive and position the standard film pack for exposure operations, a pair of opposed processing members defining therebetween a pressure nip through which each of the self-processing film units contained within the standard film pack is passed after its exposure to effect the processing thereof, the leading edge of each of the self-processing film units contained within said standard pack being spaced a given distance from the pressure nip of the processing members prior to its advancement into the nip, and pick means for engaging each film unit of the standard pack after its exposure and effecting the advancement of its leading edge into the pressure nip, said accessory comprising:

a housing having an outside surface conformation structured to snugly fit within the camera's well, said housing defining a recess to removably receive therein a modified film pack containing a plurality of self-processing film units, each being substantially smaller in size than the film units of the standard film pack and presenting a substantially smaller photosensitive area than that of the film units of the standard film pack, disposed in a stacked array to be sequentially positioned in an exposure position within the camera when the modified film pack is positioned in said accessory and the accessory is positioned within the camera's well; and relay pick means carried by said housing for transmitting movement of the camera's pick means to each of the modified film pack's film units after its exposure in a manner causing the leading edge of the exposed film unit of the modified film pack to be advanced into the pressure nip of the camera's processing members responsive to successive strokes of the camera pick means and for automatically returning to an initial position after each advancement of the camera pick means in readiness for movement of the next successive small format film sheet.

8. The invention of claim 7 wherein said relay pick means is structured to amplify the movement of the camera pick means in that said relay pick means displaces the leading edges of the film units of the modified film pack a distance greater than the distance the camera's pick means displaces the leading edges of the standard film pack's film units.

9. The invention of claim 7 wherein said housing is generally U-shaped to define its said recess.

10. A substantially thin modified film pack assemblage for use in a camera normally intended to operate with a standard pack of self-processing film units, the standard pack having a given outside surface conformation and means for defining an exposure window of given size through which film units within the standard film pack may be exposed and a substantially flat battery having major surfaces of a size on the order of the major surfaces of the standard pack film units, the camera including means for defining a well to receive and position the standard film pack for exposure operations, a pair of opposed processing members defining therebetween a pressure nip through which each of the self-processing film units contained within the standard film pack is passed after its exposure to effect the processing thereof, a leading edge of each of the self-processing film units contained within the standard pack being spaced a given distance from the pressure nip of the processing members prior to its advancement into the nip, and pick means for engaging each film unit of the standard pack after its exposure and effecting the advancement of its leading edge into the pressure nip, said modified film pack asssemblage intended for use in the camera when employed therein with an accessory comprising a housing having an outside surface conformation structured to snugly fit within the camera's well, means for defining a recess, and a relay pick for transmitting movement of the camera's pick means to each of the modified film pack's film units after its exposure in a manner causing the leading edge of the exposed film unit of the modified film unit to be advanced into the pressure nip of the camera's processing members responsive to successive strokes of the pick means of the camera and for automatically returning to an initial position after each advancement of the pick means of the camera in readiness for movement of the next successive small format film sheet, said modified film pack assemblage including:
  a battery of substantially the same outside surface conformation as that of the battery of the standard film pack;
  a container substantially smaller than the standard film pack mounted on a major surface of said assemblage battery configured to snugly fit within the recess of the accessory; and
  a plurality of small format self-processing film sheet assemblies disposed in a stacked array within said container, the thickness of modified film pack assemblage being no greater than the thickness of the accessory, said container having means for providing access of the accessory's relay pick to the forwardmost said small format film sheet assembly to facilitate its advancement into the pressure nip of the camera's processing members after its exposure.

11. In a self-processing photographic system including a camera normally intended to operate with a standard film pack in which film sheet assemblies are successively presented at a window in an upper marginal wall of film pack container, the camera having a well to receive and position a standard film pack for exposure of each film sheet assembly through the container window, a processing roller pair defining a pressure nip through which each film sheet assembly is passed for withdrawal from the film pack and ejection from the camera, and pick means for advancing each film sheet assembly from a standard film pack to the pressure nip of the processing roller pair, the improvement comprising:
  an accessory for adapting the camera to expose the small format film sheet assemblies carried in a modified film pack of a size smaller than the interior size of the well, said accessory comprising:
  a housing having exterior planar dimensions complementing the interior planar dimensions of the film pack well, said housing defining a recess to receive and position a modified film pack;
  means supported by said housing to transmit movement of the pick means of the camera to successive ones of the small format film sheet assembly presented upwardly from the modified film pack responsive to successive strokes of the pick means of the camera and for automatically returning to an initial position after each advancement of the pick means of the camera in readiness for movement of the next small format film sheet;
  said means to transmit movement of the camera pick comprises an accessory pick mounted movably on said housing in a position to engage the small format film sheet assembly presented upwardly from the modified film pack received in said recess;
  amplifying means by which movement of said accessory pick is increased over movement of the camera pick; and
  said amplifying means comprises a fixed rack mounted on said housing, a movable carrier adapted to be engaged by the camera pick, a pinion carried by said carrier in meshing engagement with said fixed rack, and a movable rack also enmeshed with said pinion, said accessory pick being carried by said movable rack for movement through a pick distance twice the distance of camera pick movement.

12. An accessory for use in a camera normally intended to operate with a standard pack of self-processing film units wherein the standard pack has a given outside surface conformation and means for defining an exposure window of given size through which film units within the standard film pack may be exposed, the camera including means for defining a well to receive and position the standard film pack for exposure operations, a pair of opposed processing members defining therebetween a pressure nip through which each of the self-processing film units contained within the standard film pack is passed after its exposure to effect the processing thereof, the leading edge of each of the self-processing film units contained within said standard pack being spaced a given distance from the pressure nip of the processing members prior to its advancement into the nip, and pick means for engaging each film unit of the standard pack after its exposure and effecting the advancement of its leading edge into the pressure nip, said accessory comprising:
- a housing having an outside surface conformation structured to snugly fit within the camera's well, said housing defining a recess to removably receive therein a modified film pack containing a plurality of self-processing film units received and positioned within a container of the film pack, and each being substantially smaller in size than the film units of the standard film pack and presenting a substantially smallerr photosensitive area than that of the film units of the standard film pack and being disposed in a stacked array to be sequentially positioned in an exposure position within the camera when the modified film pack is positioned in said accessory and the accessory is positioned within the camera's well; and
- relay pick means carried by said housing for transmitting movement of the camera's pick means to each of the modified film pack's units after its exposure in a manner causing the leading edge of the exposed film unit of the modified film pack to be advanced into the pressure nip of the camera's processing members responsive to successive strokes of the pick means of the camera and for automatically returning to an initial position after each advancement of the pick means of the camera in readiness for movement of the next successive small format film sheet;

said relay pick means comprises a fixed rack mounted on said housing, a movable carrier adapted to be engaged by the camera pick, a pinion carried by said carrier in meshing engagement with said fixed rack, and a movable rack also enmeshed with said pinion, said accessory pick being carried by said movable rack.

* * * * *